United States Patent [19]

Carenco

[11] 4,300,814
[45] Nov. 17, 1981

[54] METHOD FOR BALANCING AN INTEGRATED OPTICAL DEVICE AND A DEVICE OBTAINED BY MEANS OF SAID METHOD

[76] Inventor: Alain Carenco, 68ter, Ave. Foch, 92260 Fontenay aux Roses, France

[21] Appl. No.: 118,995

[22] Filed: Feb. 6, 1980

[30] Foreign Application Priority Data

Feb. 15, 1979 [FR] France .................. 79 03848

[51] Int. Cl.³ ............................. G02B 5/172
[52] U.S. Cl. .................. 350/96.12; 350/96.14; 350/96.15; 427/10; 427/163
[58] Field of Search ........... 350/96.12, 96.14, 96.15; 427/8, 9, 10, 163

[56] References Cited

U.S. PATENT DOCUMENTS 4,146,297  3/1979  Alferness et al. ............... 350/96.14
4,256,778  3/1981  Mizukami et al. .................. 427/10

OTHER PUBLICATIONS

V. Ramaswamy et al., "Balanced Bridge Modulator Switch Using Ti-Diffused LiNbO₃ Strip Waveguides" in *Appl. Phys. Lett.* 32(10) May 1978.
J. Polky et al., "Metal-Clad Planar Dielectric Waveguide for Integrated Optics" in *Jour. Opt. Soc. of Amer.*, vol. 64, No. 3, Mar. 1974.
Y. Yamamoto et al., "Propagation Characteristics of a Partially Metal-Clad Optical Guide: Metal-Clad Optical Strip Line" Appl. Opts., vol. 14, No. 2, Feb. 1975.
K. Rollke et al., "Metal-Clad Waveguide as Cutoff Polarizer for Integrated Optics" in IEEE Jour. Quant. Electr., vol. QE13, No. 4, Apr. 1977.

*Primary Examiner*—Stewart J. Levy

[57] ABSTRACT

A method for balancing an integrated optical device having at least two similar arms each constituted by a light guide consists in depositing a thin metal film on at least one of the two guides, in measuring the unbalance between the light intensities transmitted by the two arms and then in adjusting the dimensions of the thin metal film in order to cancel the unbalance.

7 Claims, 2 Drawing Figures

METHOD FOR BALANCING AN INTEGRATED OPTICAL DEVICE AND A DEVICE OBTAINED BY MEANS OF SAID METHOD

This invention relates to a method for balancing an integrated optical device and to a device obtained by means of said method. The invention finds an application in particular in the construction of electrooptical modulators for use in optical telecommunications.

Among the integrated optical devices employed for light modulation, the modulator of the Mach-Zehnder interferometer type plays a leading part. It is known that this device is constituted by an input waveguide divided into two arms which subsequently join together to form an output waveguide. A means for producing an adjustable phase-shift is placed on one of the two arms. The operation of this device is based on the following principle: a light beam is passed into the device through the input guide and is then split-up into two beams of equal intensity which are each propagated within one of the two arms; the two beams then recombine within the output waveguide. If the phase-shift introduced into one of the arms is equal to an odd multiple of $\pi$, the interference between the two beams is destructive and the light intensity transmitted by the output waveguide is zero. If the phase-shift is zero (to within $2\pi$), the interference is constructive and the output intensity is of maximum value. Since the phase-shifting means is usually controlled by an electric signal, this device constitutes an electrooptical modulator.

Relevant information on this type of modulator can be obtained for example from the article by V. Ramaswamy et al. entitled "Balanced bridge modulator switch using Ti-diffused LiNbO$_3$ strip waveguides" published in "Applied Physics Letters" 32(10), May 15 1978, pages 644–646, as well as from the article by H. Sasaki entitled "Efficient intensity modulation in a Ti-diffused LiNbO$_3$ branched optical waveguide device" published in "Electronics Letters", Nov. 10, 1977, vol. 13, No 23 and finally from the article by W. E. Martin entitled "A new waveguide switch modulator for integrated optics" published in "Applied Physics Letters", vol. 26, No 10, May 15, 1975, pages 562 to 564.

In principle, the light intensity transmitted by a modulator of this type varies between a minimum value which is zero and a maximum value which is equal to 1 (if the intensity of the incident beam is adopted as unity). In practice, however, since the two arms inevitably exhibit a certain degree of asymmetry as a result of dispersions in the fabrication of the light guides, the output intensity does not fall completely to zero when the modulation voltage varies.

In order to compensate for asymmetry between the two arms, the method adopted in the prior art as described in particular in the first article cited in the foregoing consists in applying a voltage to one or both of the two arms to be balanced. This solution naturally presupposes that the material constituting the light guides exhibits an electrooptical effect, thus considerably limiting its field of application. Moreover, this balancing means calls for the use of an auxiliary voltage source and consequently entails the need for additional power consumption.

The precise aim of the invention is to provide means for balancing the two arms of an optical device of this type, thereby circumventing the disadvantages noted in the foregoing. To this end, the invention proposes the use of passive (and no longer active) means which dispenses with any need for an auxiliary voltage source, said means being applicable to any type of transparent material which may or may not be electrooptical.

This result is obtained according to the invention by utilizing a thin metal film deposited on at least one of the two arms of the device, the function of this film being to produce attenuation of the light wave which propagates within said arm. The attenuation is regulated by adjusting the dimensions of the thin metal film so as to obtain perfect balancing of the two arms.

The phenomenon of attenuation of a light beam which propagates in proximity to a metal film-layer is known per se. It should be observed, however, that this interaction is always considered in the prior art as an unwanted phenomenon to be minimized. It is for this reason that, in the integrated optical devices which make use of electrodes for the application of electric fields, these electrodes are located as far as possible from the waveguide in which the light beam propagates, especially by making use of an insulating layer interposed between said electrodes and said waveguide. The present invention is in opposition to the prior art insofar as it proposes on the contrary the deliberate introduction of attenuation by means of a thin metal film.

In more precise terms, the present invention is therefore directed to a method for balancing an integrated optical device comprising at least two similar arms each constituted by a light guide, said method being distinguished by the fact that:

a thin metal film is deposited on at least one of the two guides;

the unbalance between the light intensities transmitted by the two arms is measured;

the dimensions of the thin metal film are adjusted so as to reduce said unbalance to zero.

Deposition of the thin metal film can be performed by any known means, especially by vacuum evaporation with a mask.

Preferably, in order to adjust the dimensions of the thin metal film, the procedure consists in removing material, for example by chemical or ionic attack, or by machining with a laser beam.

Preferably also, the metal employed forms part of the group comprising platinum, copper, gold, silver, chromium and aluminum.

The invention is also directed to an integrated optical device obtained by means of the method hereinabove defined. This device comprises at least two arms each constituted by a light guide and is distinguished by the fact that at least one of the two guides is partially covered by a thin metal film, the dimensions of said film being adjusted so as to cancel the unbalance between the two arms.

The invention finds an advantageous application in the balancing of electrooptical modulators of the Mach-Zehnder interferometer type. As will be readily understood, however, the invention is not limited to this device alone. The invention applies more generally to any optical device having two arms whether similar or not, in which it is desired to adjust the coefficient of transmission of one of the arms with respect to the coefficient of transmission of the other arm. For example, the device may consist of Y-shaped beam splitters of the type described in the article by W. K. Burns et al. and entitled "Active branching waveguide modulator" published in "Applied Physics Letters", vol. 29, No 12, Dec. 15, 1976, pages 790-792. The invention is further applicable to devices having four arms coupled together by a diffraction-grating deflector of the type described in the article by B. Chen et al. and entitled "Bragg switch for optical channel waveguides" published in "Applied Physics Letters", vol. 33 (1), July 1, 1978, pages 33-35. Another potential application is a directional coupler of the type described in French Pat. No. 72 11651 published on Nov. 9, 1973 and entitled "Coherent light modulation device employing an electroluminescent semiconducting diode". This is clearly not intended to be an exhaustive list and other examples can be considered.

The distinctive features and advantages of the invention will in any case become more readily apparent from the following description of exemplified embodiments which are given by way of explanation without any limitation being implied, reference being made to the accompanying drawings, wherein.

Figure 1:
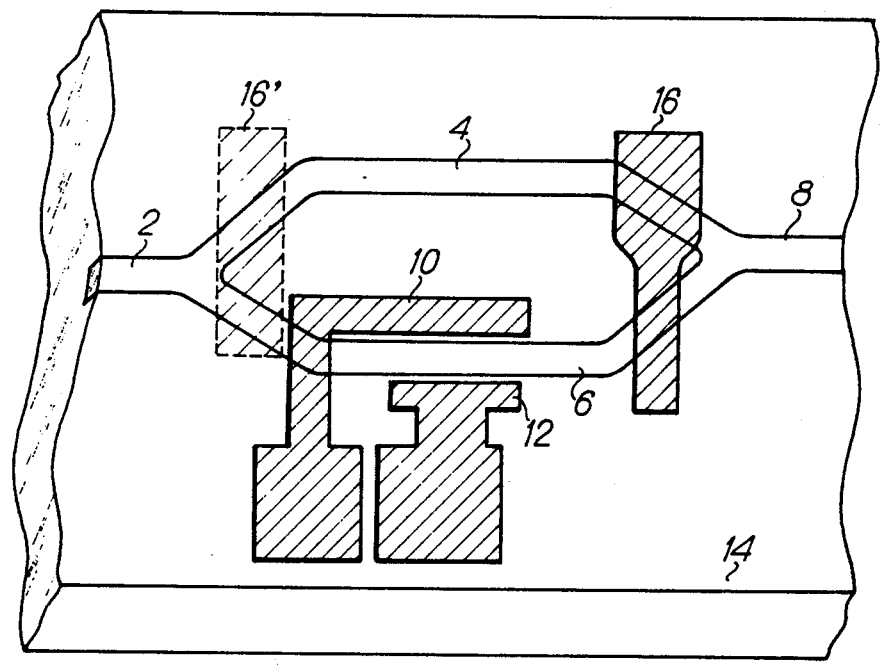
FIG. 1 illustrates an electrooptical modulator of the Mach-Zehnder interferometer type which is balanced in accordance with the invention.

The device shown in FIG. 1 comprises in known manner an optical input waveguide 2 which divides into two practically identical arms 4 and 6 and an output waveguide 8 connected to the two arms aforesaid. Electrodes 10 and 12 are placed on each side of the arm 6 and connected to a voltage source (not shown in the figure). The electric field produced between said electrodes is applied to the electrooptical material which constitutes the arm 6. The assembly formed by the elements aforementioned is deposited on a substrate 14. The operation of this device corresponds to the operation recalled earlier. A light wave introduced into the guide 2 emerges from the device through the output guide 8 with an intensity within the range of 1 to $\epsilon$ when the phase-shift produced by the electric field varies between 0 and $\pi$; the quantity $\epsilon$ depends on the extent of unbalance between the intensities transmitted by the two arms 4 and 6.

According to the invention, the device shown in the drawings further comprises a thin metal film 16 deposited on at least one of the two arms (both arms in the case illustrated). The dimensions of said thin film are adjusted in such a manner as to compensate for the difference between the amplitudes of the waves transmitted by the two arms. In the case illustrated, the thin metal film 16 covers the arm 4 over a larger area than the arm 6; in this case, the light beam which travels along the first arm is of greater intensity than the beam which travels along the second arm.

The thin metal film could naturally be placed at the input of the device, namely at 16' or both at the input and at the output.

In order to adjust the dimensions of the thin film 16, the procedure can be as follows. The voltage applied to the electrodes 10 and 12 is first adjusted so as to obtain a minimum light intensity at the output of the device. It is then sought to cancel the output signal by removing material from the thin metal film which covers one of the arms. If the extreme minimum value cannot be attained or if it is exceeded, one then proceeds to remove material from the other arm. By successive corrections, there is thus obtained a zero output intensity and, correlatively, an intensity equal to 1 in respect of a zero phase shift.

Figure 2:
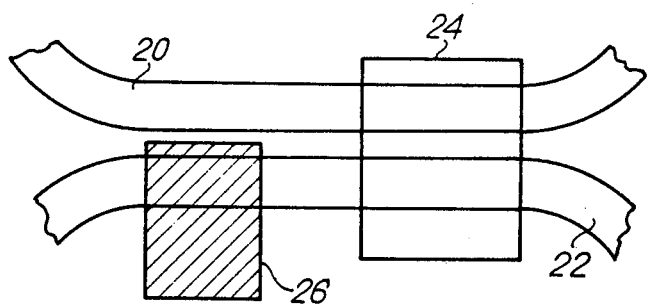
FIG. 2 illustrates a directional optical coupler which is also balanced in accordance with the invention.

The device shown in FIG. 2 is an optical directional coupler. This device is constituted in known manner by two arms 20 and 22 forming light guides, these two arms being coupled together by a means 24 for applying a suitable electric field to the two guides. A detailed description of this device will be found in the French patent cited earlier.

According to the invention, said device further comprises a thin metal film 26 on at least one of the two arms (namely on the lower arm 22 in the example illustrated). Said thin film produces attenuation of the light wave which propagates within the corresponding arm. A device of this type can constitute a 3 dB coupler, for example.

We claim:

1. A method for balancing an integrated optical device comprising at least two similar arms each constituted by a light guide, wherein said method consists:
    in depositing a thin metal film on at least one of the two guides,
    in measuring the unbalance between the light intensities transmitted by the two arms,
    in adjusting the dimensions of the thin metal film so as to reduce said unbalance to zero.

2. A method according to claim 1, wherein the procedure for adjusting the dimensions of the thin metal film consists in removing material by such means as chemical or ionic attack or machining with a laser beam.

3. A method according to claim 1 or claim 2, wherein the metal employed forms part of the group comprising platinum, copper, gold, silver, chromium and aluminum.

4. An integrated optical device obtained by means of the method according to claim 1, comprising at least two arms each constituted by a light guide, wherein at least one of the two guides is partially covered by a thin metal film, the dimensions of said film being adjusted so as to cancel the unbalance between the light intensities transmitted by the two arms.

5. An optical device according to claim 4, wherein said device is of the Mach-Zehnder interferometer type.

6. An optical device according to claim 4, wherein the two arms form a Y-shaped beam splitter.

7. An optical device according to claim 4, wherein the two arms form a directional coupler.

* * * * *